United States Patent
Bastos

(10) Patent No.: US 7,385,604 B1
(45) Date of Patent: Jun. 10, 2008

(54) FRAGMENT SCATTERING

(75) Inventor: Rui M. Bastos, Porto Alegre (BR)

(73) Assignee: NVIDIA Corporation, Santa Clara, CA (US)

( * ) Notice: Subject to any disclaimer, the term of this patent is extended or adjusted under 35 U.S.C. 154(b) by 289 days.

(21) Appl. No.: 10/982,000

(22) Filed: Nov. 4, 2004

(51) Int. Cl.
*G06T 15/50* (2006.01)
*G06T 15/60* (2006.01)
*G06G 5/00* (2006.01)

(52) U.S. Cl. ........................ 345/426; 345/614
(58) Field of Classification Search ............. 345/426, 345/614
See application file for complete search history.

(56) References Cited

U.S. PATENT DOCUMENTS

| | | | |
|---|---|---|---|
| 6,184,891 B1* | 2/2001 | Blinn .......................... | 345/426 |
| 6,252,608 B1* | 6/2001 | Snyder et al. ............... | 345/473 |
| 6,518,968 B1* | 2/2003 | Ritter et al. ................. | 345/426 |
| 6,597,363 B1 | 7/2003 | Duluk, Jr. et al. | |
| 6,639,597 B1* | 10/2003 | Zwicker et al. .............. | 345/427 |
| 6,674,430 B1* | 1/2004 | Kaufman et al. ............ | 345/419 |
| 6,771,264 B1* | 8/2004 | Duluk et al. ................. | 345/426 |
| 6,801,203 B1* | 10/2004 | Hussain ........................ | 345/506 |
| 6,809,732 B2* | 10/2004 | Zatz et al. ................... | 345/503 |
| 6,825,843 B2* | 11/2004 | Allen et al. .................. | 345/522 |
| 6,847,368 B2* | 1/2005 | Deering ........................ | 345/530 |
| 6,864,893 B2* | 3/2005 | Zatz ............................. | 345/503 |
| 6,876,362 B1* | 4/2005 | Newhall et al. ............. | 345/426 |
| 6,937,251 B2* | 8/2005 | Lewis ........................... | 345/587 |
| 6,952,206 B1* | 10/2005 | Craighead ..................... | 345/422 |
| 7,038,678 B2* | 5/2006 | Bunnell ........................ | 345/426 |
| 7,053,893 B1* | 5/2006 | Molnar et al. ............... | 345/426 |
| 7,053,904 B1* | 5/2006 | Kirk et al. .................... | 345/531 |
| 7,098,922 B1* | 8/2006 | Bastos et al. ................ | 345/506 |
| 7,116,333 B1* | 10/2006 | Peercy ......................... | 345/582 |
| 7,119,806 B1* | 10/2006 | Donovan et al. ............. | 345/426 |
| 7,126,602 B2* | 10/2006 | Sloan et al. .................. | 345/426 |
| 7,139,003 B1* | 11/2006 | Kirk et al. .................... | 345/531 |
| 7,145,565 B2* | 12/2006 | Everitt et al. ................ | 345/426 |
| 7,202,867 B1* | 4/2007 | Rodriguez et al. ........... | 345/426 |
| 7,230,618 B2* | 6/2007 | Keller .......................... | 345/426 |
| 2002/0126127 A1* | 9/2002 | Fox .............................. | 345/581 |
| 2002/0163594 A1* | 11/2002 | Greenfield et al. ........... | 348/620 |
| 2003/0016218 A1* | 1/2003 | Zwicker et al. .............. | 345/424 |
| 2003/0025707 A1* | 2/2003 | Lewis .......................... | 345/582 |
| 2003/0142101 A1 | 7/2003 | Lavelle et al. | |

(Continued)

OTHER PUBLICATIONS

Spencer et al. "Physically-Based Glare Effects for Digital Images;" 1995, ACM, pp. 325-334.*

(Continued)

*Primary Examiner*—Mark Zimmerman
*Assistant Examiner*—Crystal Murdoch
(74) *Attorney, Agent, or Firm*—Patterson & Sheridan, LLP

(57) ABSTRACT

A fragment program may configure a fragment processor to compute several output positions and associated data for a fragment, effectively scattering the fragment. Each output position may be independent of a position computed for the fragment during rasterization of a primitive. Each output position may be computed based on a point light source position to compute a shadow map corresponding to the point light source. A raster operation unit writes processed fragment data to each output position. Furthermore, the fragment program may configure the fragment processor to compute per-output position parameters for the fragment such as stencil and alpha values.

18 Claims, 6 Drawing Sheets

U.S. PATENT DOCUMENTS

| | | | |
|---|---|---|---|
| 2003/0169265 A1* | 9/2003 | Emberling | 345/552 |
| 2004/0012603 A1* | 1/2004 | Pfister et al. | 345/582 |
| 2004/0036692 A1* | 2/2004 | Alcorn et al. | 345/582 |
| 2004/0066385 A1* | 4/2004 | Kilgard et al. | 345/506 |
| 2004/0125103 A1* | 7/2004 | Kaufman et al. | 345/419 |
| 2004/0169651 A1 | 9/2004 | Everitt et al. | |
| 2004/0179020 A1* | 9/2004 | Lewis et al. | 345/582 |
| 2004/0207623 A1* | 10/2004 | Isard et al. | 345/426 |
| 2004/0212619 A1* | 10/2004 | Saito et al. | 345/441 |
| 2004/0217974 A1* | 11/2004 | Lewis | 345/611 |
| 2005/0041037 A1* | 2/2005 | Dawson | 345/611 |
| 2005/0073682 A1* | 4/2005 | Narasimhan et al. | 356/337 |
| 2005/0117019 A1* | 6/2005 | Lamboray et al. | 348/159 |
| 2005/0128196 A1* | 6/2005 | Popescu et al. | 345/420 |
| 2005/0231503 A1* | 10/2005 | Heng et al. | 345/420 |
| 2006/0055695 A1* | 3/2006 | Abdalla et al. | 345/426 |
| 2006/0077209 A1* | 4/2006 | Bastos et al. | 345/613 |
| 2006/0082577 A1* | 4/2006 | Carter | 345/426 |

OTHER PUBLICATIONS

Bloom, Charles, "Terrain Texture Compositing by Blending in the Frame-Buffer (aka "Splatting" Textures)," Nov. 2, 2000 <http://www.cbloom.com/3d/techdocs/splatting.txt>.

Green, Simon and Cem Cebenoyan, "High Dynamic Range Rendering on the GeForce 6800," Oct. 20, 2004, <http://download.nvidia.com/deve.PDF>.

* cited by examiner

FRAGMENT SCATTERING

BACKGROUND OF THE INVENTION

1. Field of the Invention

One or more aspects of the invention generally relate to processing graphics data in a programmable graphics processor, and more particularly to producing multiple output positions for a fragment.

2. Description of the Related Art

Current graphics data processing is exemplified by systems and methods developed to perform a specific operation on several graphics data elements, e.g., linear interpolation, tessellation, texture mapping, depth testing. Computation units are connected in a "shading pipeline" to perform shading operations and produce shaded fragments. In a conventional shading pipeline a position within an image that is represented as a pair of coordinates, e.g., (x,y), is specified for each fragment formed by the intersection of a pixel and a primitive. Each shaded fragment is stored in a frame buffer at the location specified by the position.

FIG. 1A is a prior art Output Buffer 130 including a Pixel 135 within a Primitive 125. Primitive 125 is defined by vertices, a Vertex 141, a Vertex 142, and a Vertex 143. A position, specified as a pair of (x,y) coordinates, is computed for a fragment within Pixel 135 during rasterization of Primitive 125. The fragment is shaded by the shading pipeline and the shaded fragment is stored in Output Buffer 130 at a location corresponding to the position. In order to control what is stored in Output Buffer 130 for each specific position and to allow, for example, reprojection of initial points into reprojected locations in a final frame buffer, Primitive 125 is tessellated to generate a very dense mesh such that each vertex in the mesh maps to a single pixel in Output Buffer 130.

FIG. 1B is a prior art highly-tessellated Primitive 125 where each pixel, such as Pixel 135, includes a corresponding vertex, such as a Vertex 145. Each vertex (and final pixel that it corresponds to) may be controlled using a vertex program, for example to control the position corresponding to where the shaded fragment will map to. Rather than tessellating a primitive, such as Primitive 125, to independently control the position corresponding to each shaded fragment within the primitive, it is desirable to control the position of a fragment without tessellating the primitive.

SUMMARY OF THE INVENTION

The current invention involves computing one or more output positions for shaded fragment data, where each output position is not necessarily based on coordinates of the incoming geometry. Multiple output positions are computed for each fragment, effectively scattering the fragment, as specified by a fragment program. The shaded fragment data is stored in a location in an output buffer corresponding to each output position. Furthermore, per-fragment operations, such as per-fragment lighting, texturing, blending, alpha testing, stenciling, or z buffering, may be determined to the original incoming fragment or the generated fragments using a fragment program or optional configuration of the pipeline and used to process the fragment.

Various embodiments of the invention include a fragment processing pipeline configured to scatter an input fragment. The fragment processing pipeline includes a fragment processor and a raster operation unit. The fragment processor is configured to process the input fragment to produce multiple output fragments, each output fragment corresponding to an output position that is optionally a reprojection of a position of the incoming fragment from one space (e.g., eye space) into another space (e.g., light space) based on the relative position and orientation of the two spaces (such as origins of a viewer and a light source). The raster operation unit is configured to write output fragment data to locations in one or multiple output buffers, each location specified by an output position corresponding to one of the multiple outgoing fragments. A buffer identifier corresponding to one of the multiple output buffers may be determined by a fragment program.

Various embodiments of the invention for producing data for one or more reference-spaces using a fragment program include a means for receiving an input fragment, a means for computing a quantity of output positions, and a means for processing the input fragment for each of the output positions. Each input fragment corresponds to a position. The quantity of output positions is computed as specified by the fragment program. The input fragment is processed for each of the output positions, as specified by the fragment program to produce output data for the input fragment

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

The current invention involves new systems and methods for processing fragment data using a fragment program to compute per-fragment output positions and generate additional fragments with associated output data. The per-fragment output positions correspond to locations within one or more output buffers used to store processed fragment data and may be computed without tessellating a primitive so each vertex within the primitive would correspond to a pixel position. Therefore fragment programs may be used to perform ray tracing algorithms, generation of high dynamic range (HDR) image data, forward-mapping algorithms, and the like.

Figure 1A:
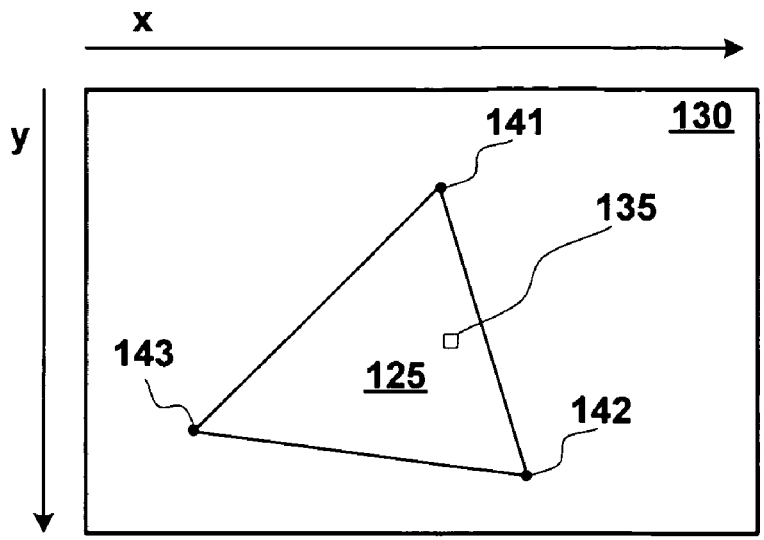
FIG. 1A is a prior art pixel within a primitive defined by vertices.
Figure 1B:
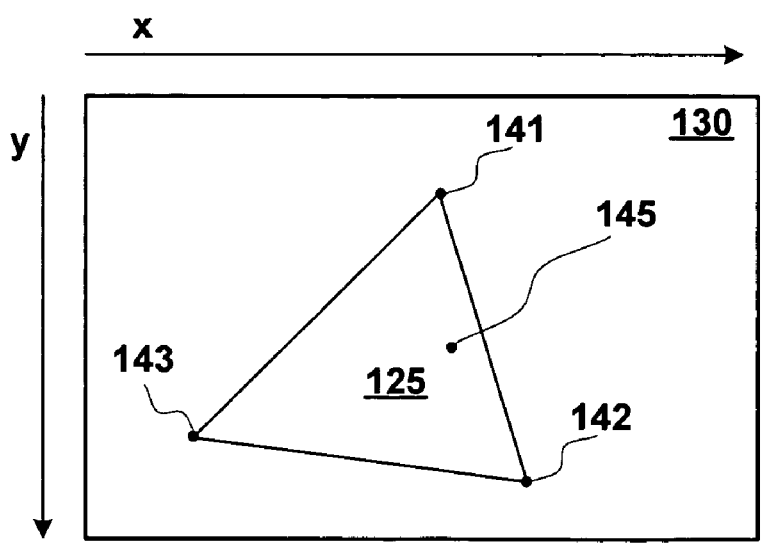
FIG. 1B is a prior art highly tessellated primitive where each pixel includes a vertex.
Figure 2:
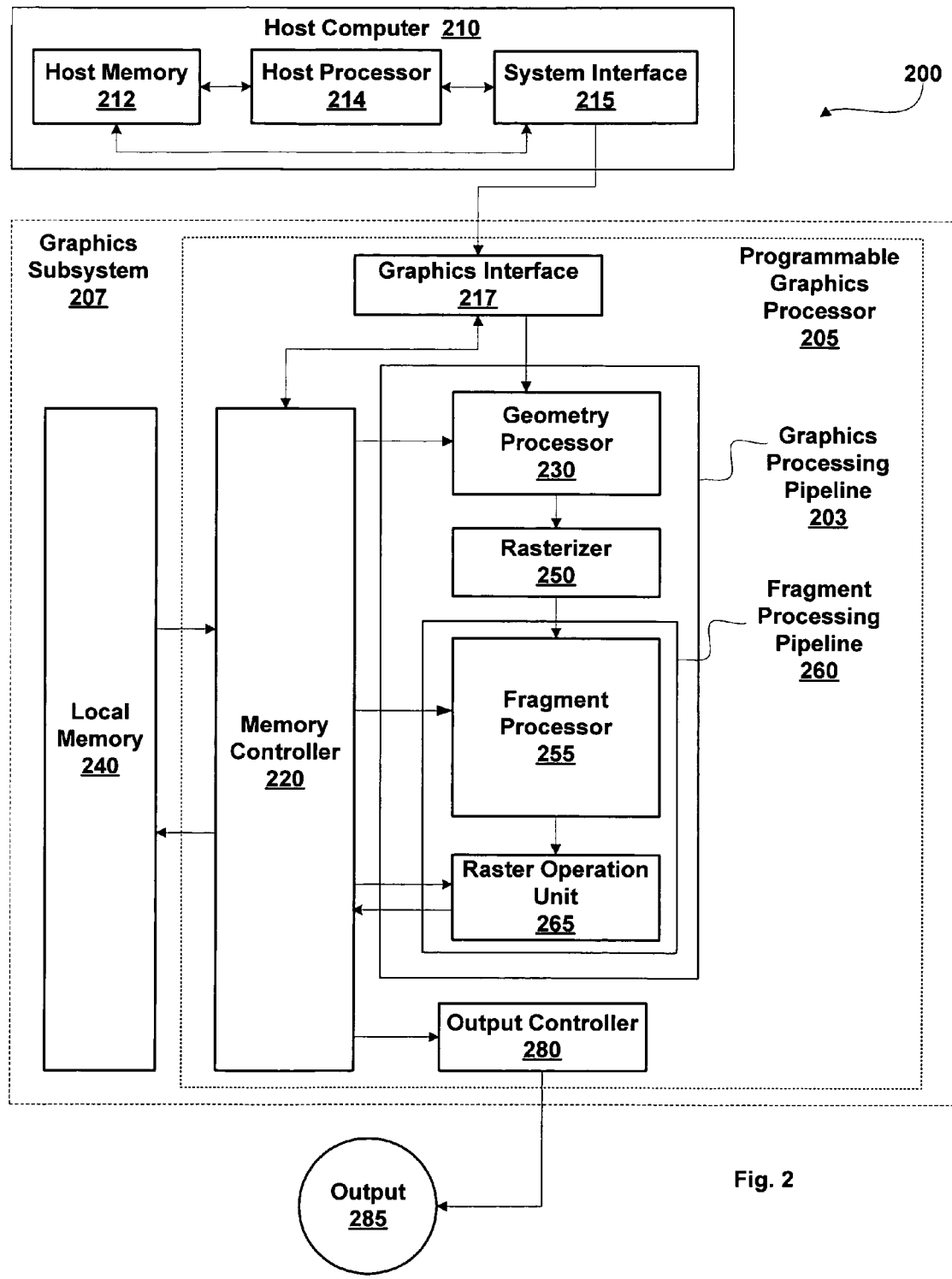
FIG. 2 is a block diagram of an exemplary embodiment of a respective computer system in accordance with one or more aspects of the present invention including a host computer and a graphics subsystem.

FIG. 2 is a block diagram of an exemplary embodiment of a Computing System generally designated 200 and including a Host Computer 210 and a Graphics Subsystem 207. Computing System 200 may be a desktop computer, server, laptop computer, palm-sized computer, tablet computer, game console, portable wireless terminal such as a personal digital assistant (PDA) or cellular telephone, computer-based simulator, or the like. Host computer 210 includes Host Processor 214 that may include a system memory controller to interface directly to Host Memory 212 or may communicate with Host Memory 212 through a System Interface 215. System Interface 215 may be an I/O (input/output) interface or a bridge device including the system memory controller to interface directly to Host Memory 212. An example of System Interface 215 known in the art includes Intel® Northbridge.

Host computer 210 communicates with Graphics Subsystem 207 via System Interface 215 and a Graphics Interface 217. Graphics Subsystem 207 may include, without limitation, a Local Memory 240 and a graphics processor, such as, Programmable Graphics Processor 205. Programmable Graphics Processor 205 uses memory to store graphics data in multiple output buffers and program instructions for a fragment or vertex program, where graphics data is any data that is input to or output from computation units within Programmable Graphics Processor 205. Graphics memory is any memory used to store program instructions to be executed by Programmable Graphics Processor 205 or output buffers containing graphics data. Graphics memory may include portions of Host Memory 212, Local Memory 240 directly coupled to Programmable Graphics Processor 205, register files coupled to the computation units within Programmable Graphics Processor 205, and the like.

In addition to Graphics Interface 217, Programmable Graphics Processor 205 includes a Graphics Processing Pipeline 203, a Memory Controller 220 and an Output Controller 280. Data and program instructions received at Graphics Interface 217 can be passed to a Geometry Processor 230 within Graphics Processing Pipeline 203 or written to Local Memory 240 through Memory Controller 220. Memory Controller 220 includes read interfaces and write interfaces that each generate address and control signals to Local Memory 240, storage resources, and Graphics Interface 217. Storage resources may include register files, caches, FIFO (first in first out) memories, and the like. In addition to communicating with Local Memory 240, and Graphics Interface 217, Memory Controller 220 also communicates with Graphics Processing Pipeline 203 and Output Controller 280 through read and write interfaces in Graphics Processing Pipeline 203 and a read interface in Output Controller 280. The read and write interfaces in Graphics Processing Pipeline 203 and the read interface in Output Controller 280 generate address and control signals to Memory Controller 220.

Graphics Processing Pipeline 203 may include, without limitation, a geometry processor, such as Geometry Processor 230 and a programmable graphics fragment processing pipeline, such as Fragment Processing Pipeline 260, which each perform a variety of computational functions. Some of these functions are table lookup, scalar and vector addition, multiplication, division, coordinate-system mapping, calculation of vector normals, tessellation, calculation of derivatives, interpolation, and the like. Geometry Processor 230 and Fragment Processing Pipeline 260 are optionally configured such that data processing operations are performed in multiple internal passes through Graphics Processing Pipeline 203 or in multiple passes through Fragment Processing Pipeline 260. Each pass through Programmable Graphics Processor 205, Graphics Processing Pipeline 203 or Fragment Processing Pipeline 260 concludes with optional processing by a Raster Operation Unit 265. Data produced in a pass through Programmable Graphics Processor 205, Graphics Processing Pipeline 203 or Fragment Processing Pipeline 260 may be written to an output buffer in graphics memory including Local Memory 240 and/or Host Memory 212 to be read from at a later time.

Vertex programs are sequences of vertex program instructions compiled by Host Processor 214 for execution within Geometry Processor 230 and Rasterizer 250. Fragment programs are sequences of fragment program instructions compiled by Host Processor 214 for execution within Fragment Processing Pipeline 260. Geometry Processor 230 receives a stream of program instructions (vertex program instructions and fragment program instructions) and data from Graphics Interface 217 or Memory Controller 220, and performs vector floating-point operations or other processing operations using the data. The program instructions configure sub-units within Geometry Processor 230, Rasterizer 250 and Fragment Processing Pipeline 260. The program instructions and data are stored in graphics memory. When a portion of Host Memory 212 is used to store program instructions and data the portion of Host Memory 212 can be uncached so as to increase performance of access by Programmable Graphics Processor 205. Alternatively, configuration information is written to registers within Geometry Processor 230, Rasterizer 250 and Fragment Processing Pipeline 260 using program instructions, encoded with the data, or the like.

Data processed by Geometry Processor 230 and program instructions are passed from Geometry Processor 230 to a Rasterizer 250. Rasterizer 250 is a sampling unit that processes graphics primitives and generates sub-primitive data, e.g., fragment data, including coverage data for each pixel or sub-pixel position. Coverage data indicates which sub-pixel sample positions within a pixel are "covered" by a fragment formed by the intersection of a pixel and a primitive. Graphics primitives include geometry data, such as points, lines, triangles, quadrilaterals, meshes, surfaces, and the like. Rasterizer 250 converts graphics primitives into sub-primitive data, performing scan conversion on the data processed by Geometry Processor 230. Rasterizer 250 outputs fragment data, corresponding to a rasterized output position, and fragment program instructions to Fragment Processing Pipeline 260. Therefore, the fragment programs configure Fragment Processing Pipeline 260 to operate on fragment data. Fragment program may also configure Fragment Processing Pipeline 260 to generate additional fragments based on the fragment data received from Rasterizer 250.

The fragment programs configure the Fragment Processing Pipeline 260 to process fragment data by specifying computations and computation precision. A Fragment Processor 255 is optionally configured by fragment program instructions such that fragment data processing operations to process an input fragment received from Rasterizer 250 are performed in multiple passes within Fragment Processor 255. Furthermore, Fragment Processor 255 may compute an output position for an additional fragment that differs from the rasterized output position received by Fragment Processor 255 for the input fragment. Fragment Processor 255 selectively outputs the rasterized output position or the computed output position as the output position for the input fragment and any additional fragments generated by Fragment Processor 255 as specified by the fragment program.

Fragment Processor 255 outputs shaded fragment data, output positions, and codewords generated from fragment program instructions to Raster Operation Unit 265. The codewords may include per-fragment operation values, such as per-fragment stencil operations, z compare functions, alpha functions, and blend functions. Raster Operation Unit 265 includes a read interface and a write interface to Memory Controller 220 through which Raster Operation Unit 265 accesses data stored in one or more output buffers in Local Memory 240 or Host Memory 212. Raster Operation Unit 265 optionally performs near and far plane clipping and raster operations, such as stencil, z test, blending, and the like, using fragment data read from the one or more buffers in Local Memory 240 or Host Memory 212 at the output position received from Fragment Processor 255 and the shaded fragment data to produce output data. The output data from Raster Operation Unit 265 is written to an output buffer in Local Memory 240 or Host Memory 212 at the output position within the output buffer associated with the output data. When a fragment program is used to modify an output position for an input fragment or generates additional output positions corresponding to the additional fragments, the fragment and additional fragments may be written to one output buffer or different output buffers.

In various embodiments Memory Controller 220, Local Memory 240, and Geometry Processor 230 are configured such that data generated at various points along Graphics Processing Pipeline 203 may be output via Raster Operation Unit 265 and provided to Geometry Processor 230 or Fragment Processor 255 as input. The output data, e.g., color, depth, and other parameters, may be processed according to a fragment program and stored in one or more output buffers in graphics memory to be used as texture maps, e.g., shadow map, height field, stencil, displacement maps, and the like, by a fragment program. Alternatively, color and depth output data may be written to an output buffer, and later read and processed by Raster Operation Unit 265 to generate the final pixel data prior to being scanned out for display via Output Controller 280 or for further processing such as for being read back to Fragment Processor 255 as a texture map. The graphics data processed by Geometry Processor 230, Rasterizer 250, or Fragment Processor 255 of Graphics Processing Pipeline 203 can be primitive data, surface data, pixel data, vertex data, fragment data, or the like.

Whenever Fragment Processor 255 reads from an output buffer that is also being written to, position conflicts should be avoided. A position conflict exists when an output position within an output buffer is read by Fragment Processor 255 or Raster Operations Unit 265 before the output position within the output buffer is written by Raster Operations Unit 265. Output positions for data to be written may be stored as state data in Fragment Processor 255. An output buffer ID specifying a unique output buffer containing data at output positions is also stored as a portion of the state data. In some embodiments of the present invention, a write flag indicates each output position that may be written by Raster Operations Unit 265. A write flag for an output position is set by Fragment Processor 255 when the output position enters proceeds past a read interface within Fragment Processor 255. The write flag for the output position is cleared by Raster Operations Unit 265 when the output position is processed and optionally written. Other techniques known to those skilled in the art may be used to detect and avoid position conflicts.

When processing is completed, an Output 285 of Graphics Subsystem 207 is provided using Output Controller 280. Alternatively, Host Processor 214 reads the composited frame, e.g., output buffer, stored in Local Memory 240 through Memory Controller 220, Graphics Interface 217 and System Interface 215. Output Controller 280 is optionally configured by opcodes, received from Graphics Processing Pipeline 203 via Memory Controller 220, to deliver data to a display device, network, electronic control system, another computing system, such as Computing System 200, another graphics subsystem, such as Graphics Subsystem 210, or the like.

Figure 3:
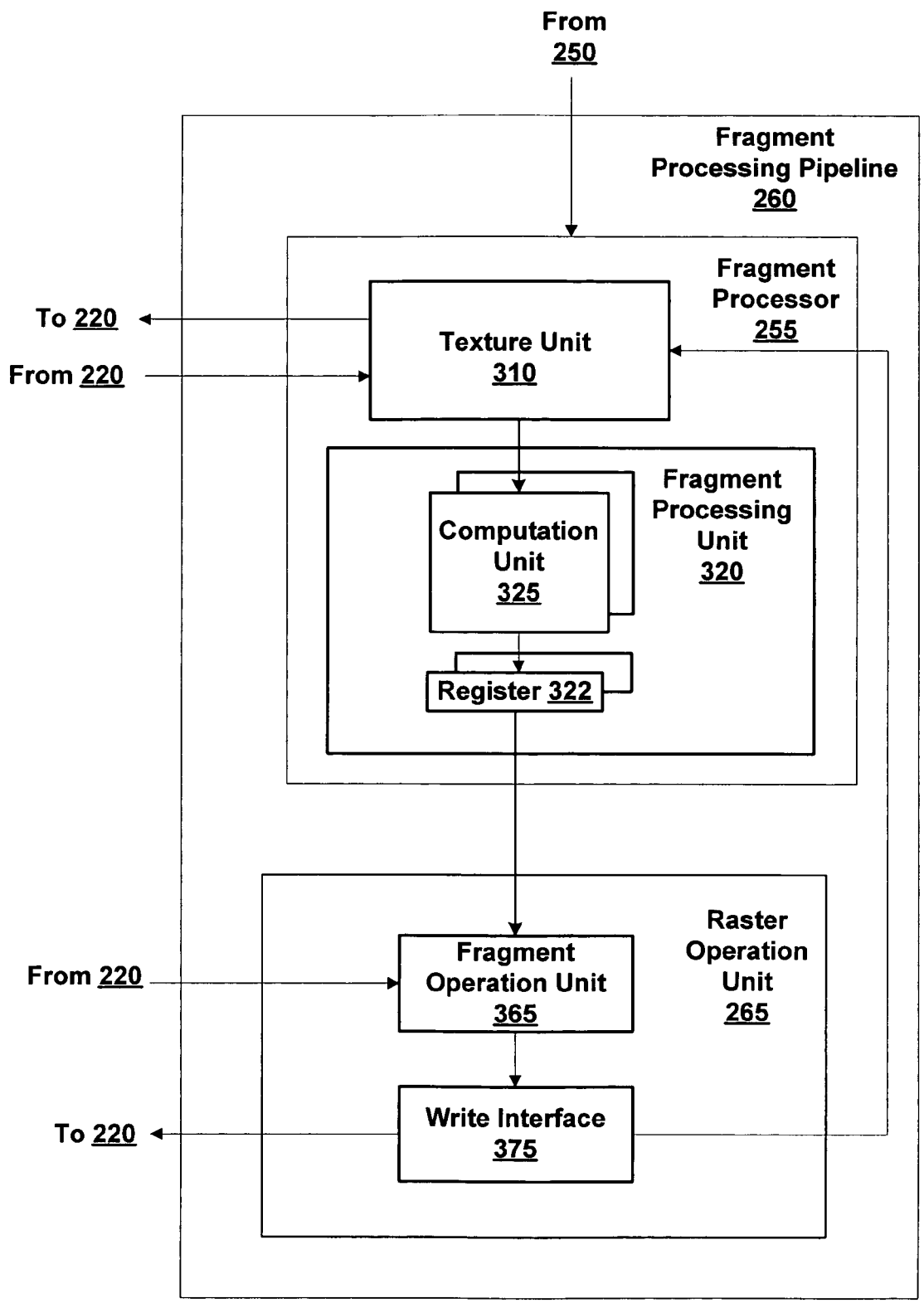
FIG. 3 is a block diagram of an exemplary embodiment of Fragment Processing Pipeline of FIG. 2 in accordance with one or more aspects of the present invention.

FIG. 3 is a block diagram of an exemplary embodiment of Fragment Processing Pipeline 260 in accordance with one or more aspects of the present invention. Fragment Processor 255, including a Texture Unit 310, receives fragment data, corresponding first output positions, and fragment program instructions from Rasterizer 250. The first output positions are interpolated coordinate pairs, e.g., (x,y), computed based on the vertex positions for each primitive. The fragment data may include parameters such as color, texture map coordinates, alpha (transparency), and the like. An interpolation unit (not shown) within Fragment Processor 255 or Rasterizer 250 may compute per-fragment parameters for each of the output positions as specified by the fragment program.

Texture Unit 310 receives texture coordinates and an output buffer identifier (ID) and determines a read address to read source data from. In some embodiments of the present invention, Texture Unit 310 is configured to perform position conflict detection prior to reading each output buffer location. Specifically, Texture Unit 310 waits to read any output buffer location for which a conflict exists until the position conflict is removed, for example by a Write Interface 375 within Raster Operation Unit 265 writing the output buffer location.

Texture Unit 310 may read additional fragment program instructions using a fragment program pointer. Texture Unit 310 receives the additional fragment program instructions and texture samples (depth map, light parameters, indices, texture map, height field, bump map, stencil values, shadow map, jitter values, and the like) stored in one or more output buffers from Local Memory 240 or Host Memory 212, via Memory Controller 220. The output buffer data stored in graphics memory may be generated by Programmable Graphics Processor 205, by Host Processor 214, by another device, by a human, or the like.

Texture Unit 310 outputs the texture samples, interpolated fragment parameters, and the additional fragment program instructions to a Fragment Processing Unit 320. Fragment Processing Unit 320 processes the texture samples and interpolated fragment parameters in one or more Computation Units 325 as specified by the additional fragment program instructions and stores shaded fragment data, e.g., color, depth, in Registers 322 as specified by the fragment program. A fragment program instruction may also configure one or more Computation Units 325 to determine one or more additional fragments and output positions, e.g., (x,y), each output position corresponding to a location in an output buffer. A Fragment Operation Unit 365 within Raster operation Unit 265 processes the fragment data received for each output position to produce processed fragment data, e.g., color, depth, stencil, or the like, that is written to one or more output buffers stored in graphics memory by Write Interface 375. The computed additional fragments and output positions with associated output data are stored in Registers 322 as specified by the fragment program. Alternatively, the first output position is stored in Registers 322 as specified by the fragment program.

For example, an additional fragment and output position may be determined based on a computed fragment parameter, such as depth, texture map coordinates, texture map identifier, color, alpha, or the like. An additional fragment and output position may also be determined based on a reference-space such as a light position, a point in time, a filter sample, or a surface characteristic resulting in a refraction, reflection, or the like. Computing an additional output position for a fragment may also be used to perform fragment scattering for forward mapping type of algorithms such as splatting, ray-tracing, and the like, as described further herein. Each additional output position is located within the output buffer specified by the first or an additional output position or within another output buffer. Each additional fragment and output position may be stored in Registers 322 as specified by the fragment program.

Figure 4:
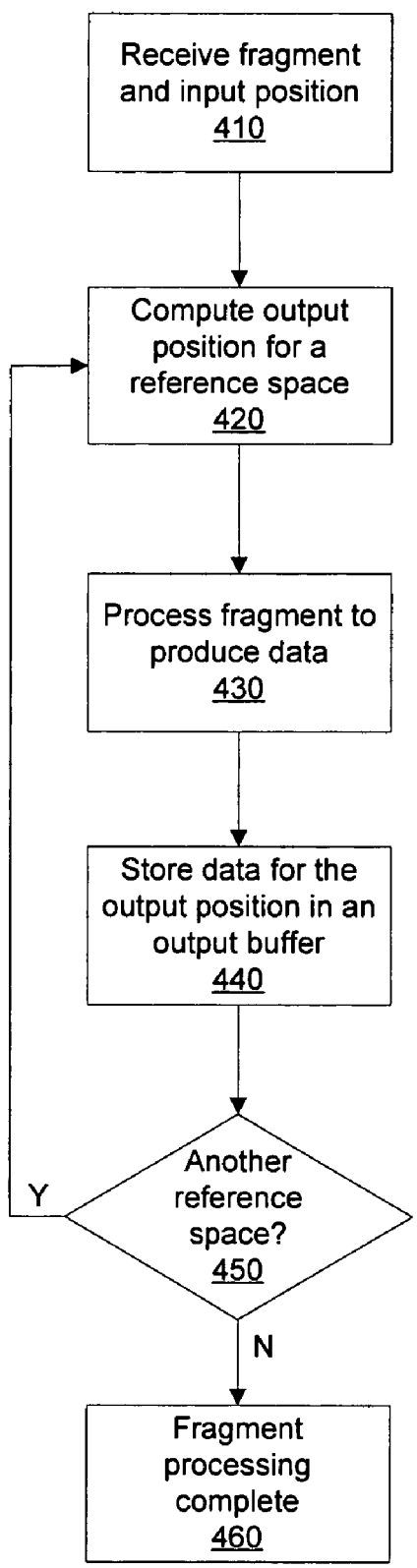
FIG. 4 illustrates an embodiment of a method of using fragment scattering in accordance with one or more aspects of the present invention.

FIG. 4 illustrates an embodiment of a method of using fragment scattering in accordance with one or more aspects of the present invention. In step 410 Fragment Processor 255 receives an input fragment and an input position. In step 420 fragment program instructions configure Fragment Processor 255 to compute an output position for a reference-space. For example, the reference-space may be a light source reference-space or a filter value within a kernel applied to each input position within an image. Alternatively, the reference-space may be a function specified by a fragment program to generate one or more output positions for an input fragment, thereby scattering the input fragment.

In step 430 Fragment Processor 255 processes the input fragment according to the fragment program to produce data. The data may correspond to the input position or to the one or more output positions. For example, one or more additional fragments may be generated for each input fragment based on a surface characteristic to produce high-dynamic range image effects such as glow, bloom, glare, or the like.

In step 440 Fragment Processor 255 outputs the input fragment, and input position and/or any additional fragments and corresponding additional output positions to Raster Operation Unit 265 which stores data for the output position and/or any additional output positions in one or more output buffers. In some embodiments of the present invention the data is combined with data read from Local Memory 220 using blending operations or raster operations. In one embodiment of the present invention, output fragments include luminance map data which is filtered to compute an average luminance for a scene. The average luminance and luminance map data may be used to perform tone mapping to generate an image for display.

In step 450 the fragment program determines if another reference-space is used to process the input fragment and input position, and, if so, steps 420, 430, and 440 are repeated for an additional reference-space. For example, an additional reference-space may be used which corresponds to an additional light source in a scene. Conventionally soft shadow mapping is performed by dividing an area light source into several point light sources, e.g., N point light sources. A scene is rendered N times, each time from the point of view of one of the N point light sources to produce N shadow maps, each shadow map corresponding to one of the point light sources. Each shadow map includes shadow data, e.g., depth, stencil, alpha, and the like, for use during shading of the scene. Conventionally, the image data for the scene are processed for each of the N point light sources to generate a shadow map corresponding to each of the N point light sources. As previously described, in one embodiment of the present invention each input fragment and input position may be processed for each of the N point light sources to produce N shadow maps, thereby scattering the input fragment based on each of the N light source reference-spaces. Unlike conventional soft shadow mapping, the shadow map data for N point light sources representing one area light source are produced by processing each fragment in a single pass through Graphics Processing Pipeline 203 to produce multiple outputs—each of the multiple outputs written into one of the multiple output shadow buffers.

If, in step 450 the fragment program determines another reference-space is not used to process the input fragment and input position, then in step 460 processing of the input fragment and input position is complete. Additional input fragments corresponding to additional input positions may be processed by repeating steps 410, 420, 430, 440, 450, and 460. In other embodiments of the present invention, forward mapping algorithms, ray-tracing, and the like may be performed as described in conjunction with FIGS. 5 and 6.

Each output fragment has an output position, computed by Fragment Processor 255, that may be independent from output positions of the incoming fragment and the other output fragments associated with one input fragment. Furthermore, each input fragment and input position is processed independently, according to a fragment program to produce one or more output fragments and positions. In alternate embodiments of the present invention, the quantity of output fragments produced from an input fragment is determined based on a predetermined parameter or a parameter or function determined by a fragment program.

Figure 5:
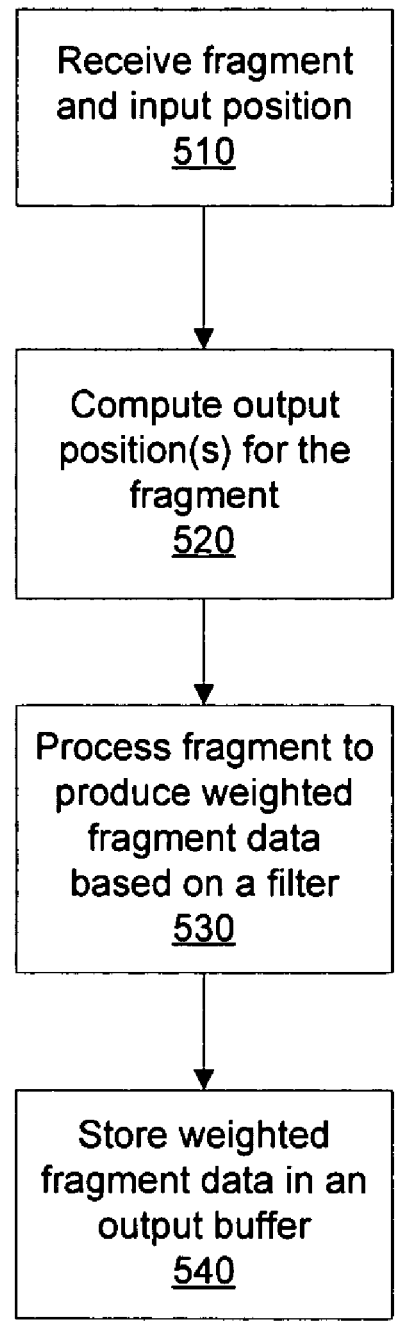
FIG. 5 illustrates an embodiment of a method of using fragment scattering to perform forward-mapping algorithms in accordance with one or more aspects of the present invention.

FIG. 5 illustrates an embodiment of a method of using fragment scattering to perform forward-mapping algorithms in accordance with one or more aspects of the present invention. In step 510 Fragment Processor 255 receives an input fragment and an input position. In step 450 fragment program instructions configure Fragment Processor 255 to compute one or more output positions based on a reference-space.

In one embodiment of the present invention, a splatting application is performed and each reference-space corresponds to a filter kernel or a filter value within a filter kernel. The filter may be used to generate a high dynamic range image or other image post-processing effects.

In step 530 the fragment program instructions configure Fragment Processor 255 to process the input fragment to produce weighted fragment data, i.e. output fragments, based on a filter kernel or a filter value. For example, a splatting application may apply the filter values in a neighborhood covered by the filter kernel to each fragment (texel) in a source image. In some embodiments of the present invention the filter kernel may produce a glow, bloom, glare or other high dynamic range image effect. In other embodiments of the present invention, the filter kernel may produce a motion blur effect, such that each filter value corresponds to a different time sample, or other image post-processing effects.

In step 540 the output fragments are stored in an output buffer. Each output fragment is written to a location in the output buffer corresponding to an output position covered by the filter kernel in a destination image. In contrast, when backward mapping is used to produce the destination image each fragment contributing to an output position in the destination image is determined and weighed by a filter value corresponding to each fragment position. Weighed fragments are combined to produce the output fragment for the output position in the destination image. Using forward mapping instead of backward mapping to produce a destination image may result in improved performance.

A fragment program executed by Fragment Processor 255 may scatter an incoming fragment to multiple output positions, optionally reprojecting a point in another space with respect to a reference space (e.g., eye space) corresponding to the input fragment. The point is reprojected based on the relative position and orientation corresponding to a first reference-space, to produce a first output position for first outgoing fragment data, optionally reprojecting the incoming fragment into additional reference-spaces corresponding, for example, to additional light sources, to produce additional output positions for additional outgoing fragment data. The first outgoing fragment data is stored in a first output buffer at a location specified by the first output position and the additional generated fragments are stored into the same buffer or into additional buffers, as determined by the fragment program or as pre-determined by other applicable a priori conditions.

Figure 6:
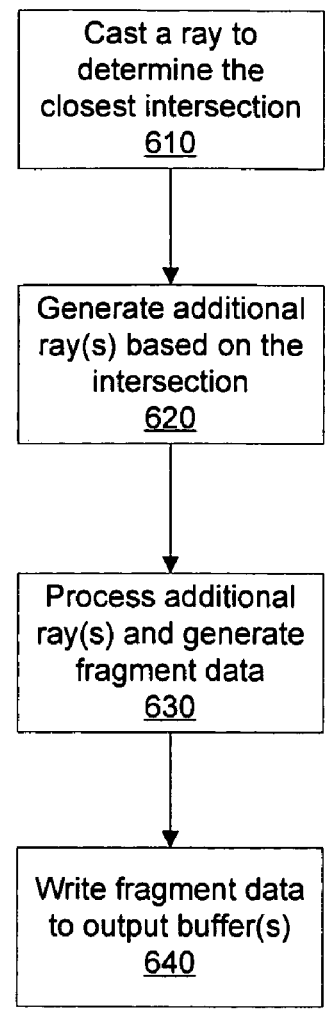
FIG. 6 illustrates an embodiment of a method of using fragment scattering to perform ray-tracing in accordance with one or more aspects of the present invention.

FIG. 6 illustrates an embodiment of a method of using fragment scattering to perform ray-tracing in accordance with one or more aspects of the present invention. A viewpoint is divided into multiple originating rays and in step 610 an originating ray is cast and the closest intersection of the ray and a surface within a scene is determined. In step 620 the fragment program instructions configure Fragment Processor 255 to generate one or more additional rays based on the intersection. The additional rays may be generated based on a material characteristic of the intersected surface. Specifically, an additional ray may be generated for each light source in the scene, a reflected ray may be generated, or a refracted ray may be generated. Additional rays may also be generated to produce a soft effect including depth of field and motion blur. For example, for a motion blur the multiple originating rays are each sampled at different points in time and each originating ray intersects with a surface to produce one or more additional rays.

In step 630 the fragment program instructions configure Fragment Processor 255 to process the one or more additional rays to produce fragment data. In some embodiments of the present invention the fragment data is shadow map data. In step 640 the fragment data is written into one or more output buffers. For example, shadow map data may be written into an output buffer corresponding to a particular light source. With several output buffers storing shadow map data for a scene including several light sources.

A fragment processor executing a fragment program may generate one or more output fragments for each input fragment. Furthermore, each output fragment corresponds to an output position which may be the same as an input position of the input fragment or computed by the fragment processor. The per-fragment output positions correspond to locations within one or more output buffers used to store the output fragments. Each output position may be computed without tessellating a primitive so that each pixel within the primitive corresponds to a vertex position. Reducing the need to tessellate reduces the processing or time needed to generate the data stored in the one or more output buffers.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A fragment processing pipeline for producing data for one or more reference-spaces using fragment program instructions, the pipeline comprising:
    a single fragment processor including a texture unit for receiving an input fragment corresponding to a position and configured to compute a plurality of output positions as specified by the fragment program instructions for each of the received input fragments received from a rasterizer; and
    process the received input fragment for each of the output positions, as specified by the fragment program instructions to produce per-fragment parameters for each of the plurality of output positions based on the received input fragment, and
    a raster operations unit configured to write portions of the output data in separate output buffers in response to the texture unit receiving texture coordinates and to generate an output buffer identifier specifying one of the separate output buffers for each of the output positions, wherein each portion of the output data corresponds to one of the one or more reference-spaces; wherein the one or more reference-spaces are multiple light sources and the fragment program generates a shadow map for each of the multiple light sources for a scene including the input fragment and the multiple light sources.

2. The pipeline of claim 1, wherein the quantity represents all light sources in a scene including the input fragment.

3. The pipeline of claim 1, wherein the raster operations unit is further configured to combine output data for each of the output positions to produce combined output data and storing the combined output data in an output buffer.

4. The pipeline of claim 1, wherein each of the light sources is a point light source.

5. The pipeline of claim 1, wherein each of the light sources is an area light source.

6. The pipeline of claim 1, wherein the output data is high dynamic range texture map or image data.

7. The pipeline of claim 1, wherein each of the output positions are interpolated coordinate pairs computed based on a vertex position for each primitive.

8. The pipeline of claim 1, wherein the texture unit is programmable and is configured to read additional fragment program instructions and output the instructions and texture samples to the fragment processor for processing the input fragment.

9. The pipeline of claim 1, wherein the fragment processor is programmable and is configured to receive an input fragment and an input position for a reference-space, wherein the reference space is a function specified by a fragment program to generate a plurality of output positions for the input fragment.

10. They pipeline of claim 9, wherein the fragment processor is configured to process the fragment on the basis of the input position.

11. The pipeline of claim 9, wherein the fragment processor is configured to process the fragment on the basis of the plurality of output positions.

12. The pipeline of claim 11, wherein the fragment processor is further configured to store the output buffer identifier stored with the received fragment data and includes a write flag controlled by the fragment processor to avoid position conflicts with the raster operations unit.

13. A pipeline as claimed in claim 1, wherein the means comprising a fragment processor includes a single processor to generate output data from a single input fragment and store the output data in the multiple output buffers.

14. The pipeline of claim 1, wherein the fragment processor is configured to received fragment data from the raster operations unit and compute an output position of the received fragment that differs from an output position received from the raster operations unit for the received fragment.

15. A fragment processing pipeline configured to scatter an input fragment, comprising:
   a single fragment processor configured to process the input fragment corresponding to an input position in a given reference-space to produce data for multiple output fragments, each of the multiple output fragments corresponding to an output position that is a function of a reference-space position and orientation; and
   a raster operation unit configured to write the data for one of the multiple output fragments directly to a first output buffer and to write the data for another one of the multiple output fragments directly to a second output buffer without transfer through the first output buffer, wherein the first output buffer corresponds to a first reference-space and the second output buffer corresponds to a second reference-space, wherein the fragment processor is configured to received fragment data from the raster operations unit and compute an output position of the received fragment that differs from an output position received from the raster operations unit for the received fragment, wherein the one or more reference-spaces are multiple light sources and the fragment program generates a shadow map for each of the multiple light sources for a scene including the input fragment and the multiple light sources.

16. The fragment processing pipeline of claim 15, wherein the location in the first buffer is specified by an output position corresponding to the one of the multiple output fragments.

17. The fragment processing pipeline of claim 15, wherein the raster operation unit is configured to write a portion of the output fragment data to locations in other output buffers.

18. The pipeline of claim 15, wherein the fragment processor is further configured to store the output buffer identifier stored with the received fragment data and includes a write flag controlled by the fragment processor to avoid position conflicts with the raster operations unit.

* * * * *

UNITED STATES PATENT AND TRADEMARK OFFICE
CERTIFICATE OF CORRECTION

PATENT NO.         : 7,385,604 B1
APPLICATION NO.    : 10/982000
DATED              : June 10, 2008
INVENTOR(S)        : Rui M. Bastos Page 1 of 1

It is certified that error appears in the above-identified patent and that said Letters Patent is hereby corrected as shown below:

In Column 10, Line 53 please replace "They" with --The--.

Signed and Sealed this

Third Day of March, 2009

JOHN DOLL
*Acting Director of the United States Patent and Trademark Office*